United States Patent [19]
Cohen et al.

[11] Patent Number: 5,094,306
[45] Date of Patent: Mar. 10, 1992

[54] APPARATUS FOR CONTROLLING THE TRANSPORT MECHANISM OF A WEIGHING SCALE

[75] Inventors: Jack A. Cohen, Norwalk; Frederick M. Kipp, Fairfield, both of Conn.

[73] Assignee: Pitney Bowes Inc., Stamford, Conn.

[21] Appl. No.: 631,549

[22] Filed: Dec. 21, 1990

[51] Int. Cl.$^5$ .......................... G01G 19/00; G01G 3/14
[52] U.S. Cl. ................................. 177/145; 177/210 FP
[58] Field of Search ........................... 177/145, 210 FP

[56] References Cited
U.S. PATENT DOCUMENTS 4,778,018 10/1988 Cordery et al. ............... 177/210 FP
4,836,311 6/1989 Hubbard .............................. 177/145
4,842,084 6/1989 Pirc ..................................... 177/145

Primary Examiner—George H. Miller, Jr.
Attorney, Agent, or Firm—Peter Vrahotes; Melvin J. Scolnick; David E. Pitchenik

[57] ABSTRACT

A control for a transport mechanism vibrating tray scale that conveys flats on and off of the platform of the tray. The scale supports a follower plate that has ramps which contact with the rollers of the transport mechanism. The follower plate is also in contact with a cam which upon rotation cause the follower plate to move within the scale. As the follower plate is moved, the rollers of the transport mechanism will move into and out an opening of the scale platform, depending upon direction of movement of the follower plate.

9 Claims, 3 Drawing Sheets

APPARATUS FOR CONTROLLING THE TRANSPORT MECHANISM OF A WEIGHING SCALE

BACKGROUND OF THE INVENTION

As described in U.S. Pat. No. 4,778,018, vibrating tray scales have been developed wherein flat articles hereinafter referred to as flats, such as envelopes, letter mail and parcels are conveyed onto the tray, or platform, of the scale. After a flat article has been conveyed onto the platform, the conveying mechanisms are withdrawn from the path of the flat, the platform is unlocked so that it is free to vibrate, the flat article is held firmly against the platform and the platform is actuated to vibrate. A transducer is connected to a flexible member that supports the platform and, based upon the amount of vibration, the weight of the article can be determined. After the weight is determined, the platform is locked once more, the driving mechanism engages the flat article and the flat article is driven away from the scale.

An extensive amount of development has taken place with the vibrating tray scale first disclosed in 4,778,018, as shown in U.S. Pat. Nos. 4,856,602, 4,848,492, 4,836,311, and 4,844,188 among others. With such a scale, one is able to weigh two flats a second with accuracy to 0.001 ounces. Although the scales have operated in a most satisfactory manner, there has been one area in which constant improvement has been sought and this is the article transportation mechanism. As one might imagine in a conveying mechanism of this type, wear is always a problem. When one is to weigh two articles a second clearly one operates the mechanism a large number of times within a short period. For example, in one day's processing of mail pieces, it is not unusual for a scale of the type described to perform 10,000 times. Over a period of a few months, clearly quit a bit of wear occurs either on the rollers or on a belt trained about the rollers as described in U.S. Pat. No. 4,856,602. It therefor would be advantageous to provide a drive mechanism that can be easily replaced, and which will perform its operations faster and in a quite, smooth manner.

BRIEF SUMMARY OF THE INVENTION

A drive control mechanism for a vibrating tray scale has been conceived for conveying flats onto and from the scale platform. A slideable plate with ramped surfaces at the top thereof is located within the scale. Transport rollers for transporting flats are received supported by such ramp surfaces and the drive rollers are receivable within an opening in the scale platform. As the plate is moved by a cam member the rollers move along the ramped surface upwardly or downwardly depending upon the direction of travel of the plate. Thus, the plate can be moved in one direction to move the transport rollers into driving contact with a flat on the platform and in the other direction to remove the drive rollers from contact with the flat article during the weighing operation. With such cammed movement, the rollers are moved quietly and without the need of springs to return the plate to its original position.

DETAILED DESCRIPTION OF THE PREFERRED EMBODIMENT

Figure 1:
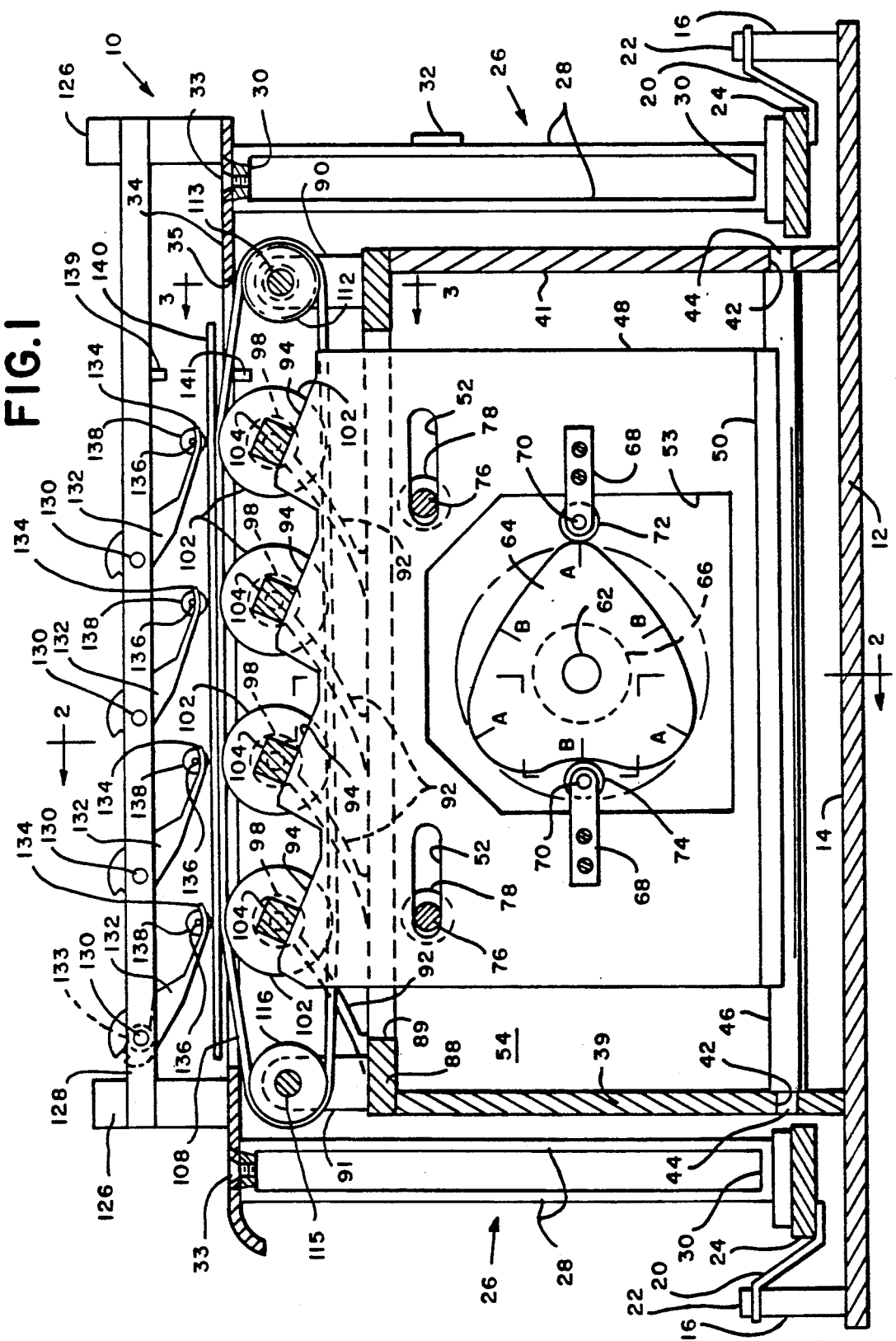
FIG. 1 is a cross section view of a vibrating tray scale that incorporates the features of the instant invention with portions cut away for clarity.
Figure 2:
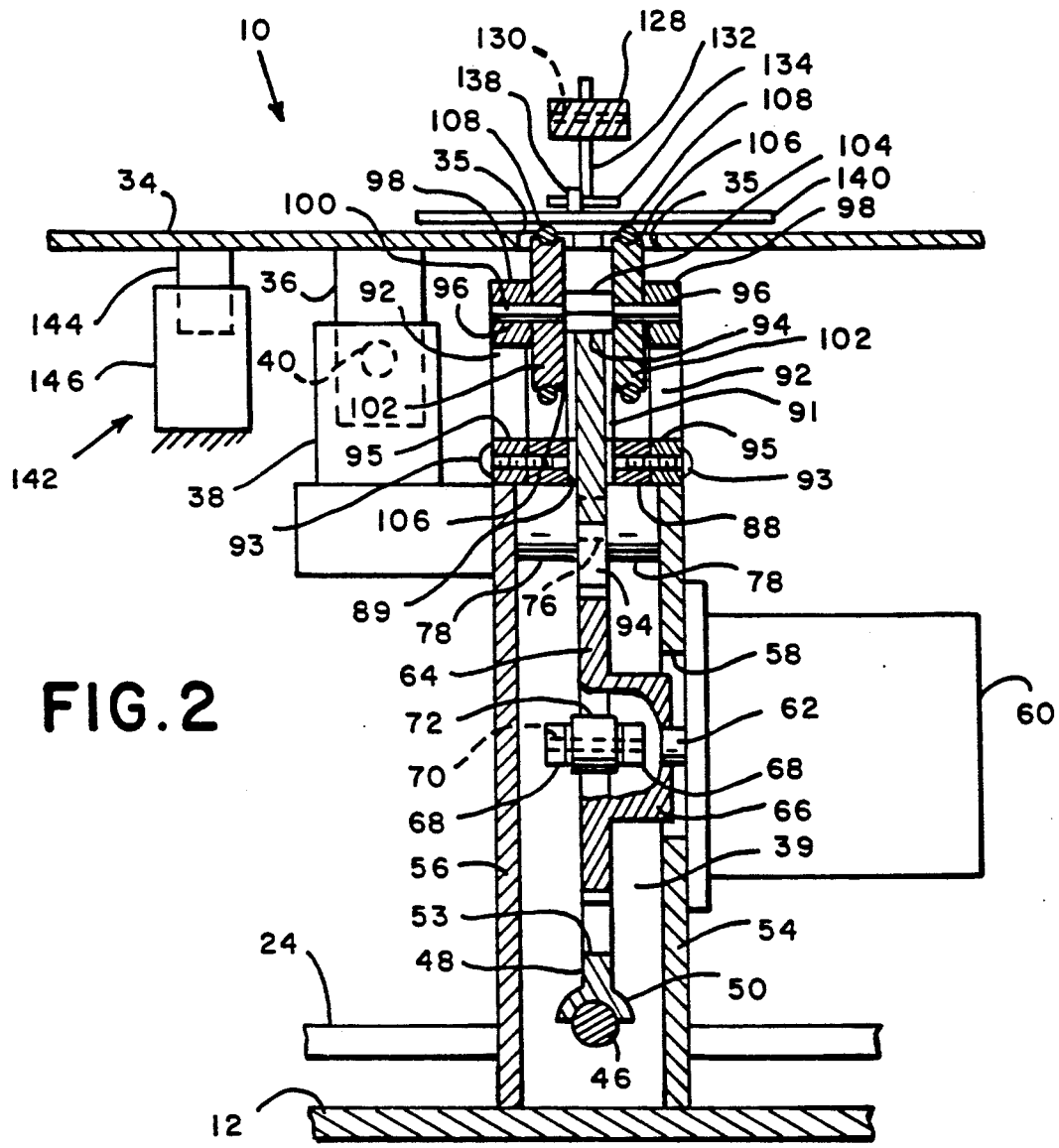
FIG. 2 is a view taken along the lines two-two of FIG. 1.
Figure 3:
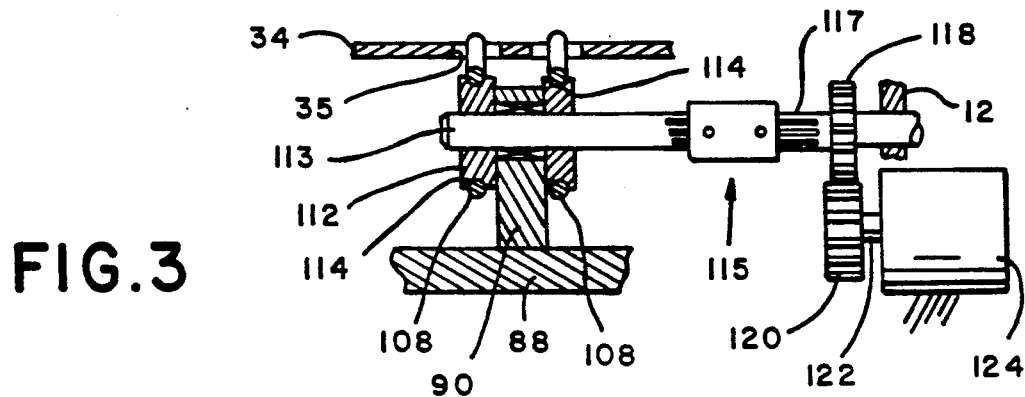
FIG. 3 is a cross sectional view of the drive train for the transport mechanism of the scale shown in FIG. 1.

Referring now to FIGS. 1-3, a vibrating tray scale is shown generally at 10 and includes a housing 12 that provides support for components of the scale. Four uprights 16 (only two being seen in FIG. 1.) are supported by the floor 14 of the housing 12 and each of the uprights supports a generally Z shaped leaf spring 20 that is attached to the upright as by a bolt 22. A pair of laterally extending plates 24 provided with each plate being is supported by the springs 20 and each of the plates supports a pair of flexible members 26. Each of the flexible members 26 has a pair of flat spring members 28 joined at their ends by an integral brace 30. The spring members 28 support a platform 34. One of the spring members 28 has a transducer 32 attached thereto, the transducer being connected to a electronic controller 156 (see FIG. 3).

The platform 34 has a pair of longitudinally extending openings 35 therein. An armature 36 depends from the platform 34 and is received within an electromagnet 38 that has positive and negative poles 40 (only one being shown). Reference can be had to U.S. Pat. No. 4,778,018 for details relative to such electromagnet. Actuation of the electromagnet for a short period causes the platform 34 to oscillate as described in said patent.

Details of what has been shown and described relative to the vibrating tray scale 10 can be found in U.S. Pat. No. 4,836,311, 4,844,188 and 4,836,313 and do not form part of the invention except for describing the environment in which the invention resides.

A pair of end walls 39, 41 form part of the housing 12 and are supported by the floor 14. Each end wall 39, 41 has an opening 42 therein. The openings 42 receive the stub 44 of a shaft 46 which slidingly supports a follower plate 48 that has a yoke 50 integral therewith that is in engagement with the shaft 46. The follower plate 48 has a pair of longitudinally extending openings 52 and a central opening 53 therein.

With particular reference to FIG. 2, a pair of side walls 54 and 56 form part of the housing 12 and are supported by the floor 14. The side wall 54 has an opening 58 therein that receives the output shaft 62 of a motor 60, the motor being attached to the side wall 54. A heart shaped cam 64 is attached to a hub 66 mounted on the output shaft 62 to be rotated thereby. Two pairs of brackets 68 are supported by the follower plate 48 so as to extend into the opening 53. Each pair of brackets 68 supports a pin 70 upon which cam followers 72 and 74 are mounted. Thus, as the cam 64 is rotated the cam followers 72, 74 will drive the follower plate 48 to move longitudinally. A pair of pins 76 are received within the elongated openings 52 of the plate 48 and are supported by spacers 78 that are attached to the side walls 54 and 56. The pins 76 act as guides for the follower plate 48 during the movement of the plate and the spacers 78 prevent rocking of the follower plate 48.

The end walls 39, 41 support the floor 88 of a transport mechanism that is adapted to transport a flat across the platform 34 as will be described hereinafter. A pair of posts 90, 91 are located on opposite longitudinal ends of the floor member 88.

A plurality of arms in the form of leaf springs 92 are secured to the floor member 88, four such leaf springs being shown. The leaf springs are resilient with their natural position being low in the vicinity the floor member 88. Each arm 92 has a hub 98 at the end thereof with an opening 96 therein. The upper portion of the follower plate 48 has a plurality of ramps 94. Each hub 98 fixedly receives a shaft 100 that is received within each opening 96 and supports a rectangular ramp follower 104. Each ramp follower 104 is in contact with a ramp 94. A flat section of the ramp follower touches and slides along its respective ramp. A pair of rollers 102 is rotatably mounted on each shaft 100, a roller being on an opposite sides of each ramp follower 104. The rollers 102 have a grove 106 about the perimeters thereof for receiving a belt 108.

A pair of drive rollers 112 are rotatably mounted on the upright 90 by a fixed shaft 113 that extends through and beyond the paired uprights. The drive roller 112 also have groves 114 about the perimeters thereof to receive a belt 108. The shaft 113 is receives with a splined disconnect 115 that also receives a splined stub shaft 117 that supports a gear 118 and in turn is rotatably supported by the housing 12. The gear 118 meshes with a gear 120 secured to the output shaft of a motor 124. The uprights 91 support a pair of idler rollers 116 by a shaft 115 that is mounted between the two uprights. These idlers rollers also have peripheral groves therein to receive the belt 108 and a belt 108 is trained about all the rollers that are longitudinal aligned with one another, there clearly being two belts. The belts 108 are made of an elastomeric material so as to yield with movement of the rollers.

The heart shaped cam 64 is a well known type of cam and is termed a positive motion cam because the follower plate 48 does not depend on springs to return the follower plate to it's starting position. The return motion is made positive by one of the cam followers 72, 74 depending upon direction of travel. The force of the cam 64 action on the follower plate 48, through cam followers 72, 74 is directly in line with the follower plate; therefore, this action is balanced and free of any sidewise forces. Furthermore, the cam face is at the center of the roller shafts 100 and the rollers 102 are balanced by the two belts 108. Thus, in the transport mechanism the forces are balanced and symmetrical about the center line.

The platform 34 has a pair of opposed walls 126 with a beam 128 extending there across to be supported by such walls. A plurality of pins 130 are mounted on the beam 128 and each pin 130 has an arm 132 supported thereon, there being a spring member 133 between each pin 130 and arm 132 combination to bias the arms in a clockwise direction. The lower portion of the arms 132, form skis 134 and each of the skis has a pin 136 and an opening 135 that rotatingly supports and receives a roller 138. A flat 140 is shown intermediate the rollers 138 and the belts 108. A light 139 is supported by the beam 128 and a sensor 141 is supported by the frame 12 in alignment with one another so as to sense the leading edge of a flat 140 as it is transported across the platform 34. A locking mechanism is shown generally at 142 and is supported by the housing 12. The locking mechanism includes a finger 144 that is located between a pair of arms 146 that are actuated to engage the finger 144 when the platform is to be locked. Details of such locking mechanism can be found in U.S. Pat. Nos. 4,778,018 and 4,836,312. The mechanism for locking the platform 34 may be of any type and does not form part of the invention expect that it is a necessary element in the operation of the vibrating tray scale 10.

Figure 4:
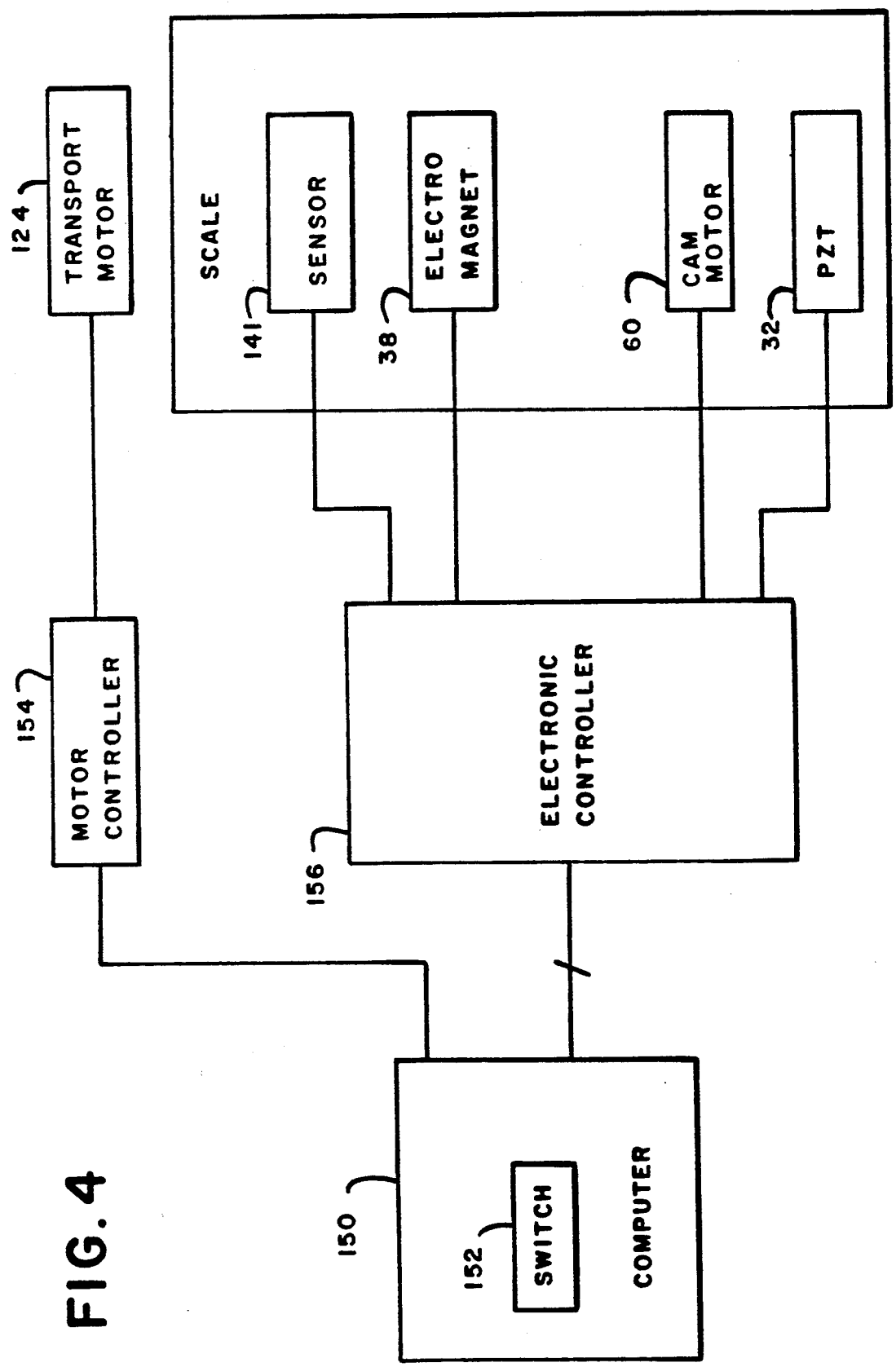
FIG. 4 is a block diagram showing the electronic circuit of the scale shown in FIG. 1.

With reference now to FIG. 4, the electronic circuitry of the vibrating tray scale 10 will be described. A computer 150 is provided, such as an IBM PS 2 Model 50, that has a switch 152 thereon for actuating the circuitry. A motor controller 154 is in communication with the computer 150 and also with the transport motor 124. An electronic controller such, as an Intel 2036, is in communication with the computer 150 and with the sensor 141, the electromagnet 38, the cam motor 60 and the transducer 32.

In operation, flats 140 will be provided serially to the nip between the first roller 138 on the left as seen in FIG. 1, and the belts 108. The transport motor 124 will be actuated to drive the drive roller 112 thereby driving the belts 108. As a flat 140 is conveyed across the platform 34 by the belts 108 in cooperation with rollers 138, the leading edge will be sensed by the sensor 141 and this will be communicated to the computer 150 by way of the electronic controller 156. Upon such occurrence, the motor controller 154 under control of the computer 150 will cause the transport motor 124 to become inoperative. It will be noted that the flat 140 is a little beyond the sensor 141 because of its momentum. In the transport mode, the locking mechanism 142 will be operative so as to lock the platform 34, but upon the motor 124 being disabled the locking mechanism will disengage to thereby allow the platform to have freedom of movement. Simultaneously the cam motor 160 will be actuated so that the cam 64 is rotated to drive the plate 48 to the left as seen in FIG. 1. It will be noted that the cam 64 has three locations indicated by the letter A and three locations as indicated by the letter B. In the position shown in FIG. 1, the cam follower 72 will be in engagement with a location A and the belts 108 are an engagement with the envelope 140, but upon the cam being rotated 60°, the cam follower 74 will be in engagement with the cam 64 at a location A while the cam follower 72 will contact at a location B and the follower plate 48 being moved to left as seen in FIG. 1. The ramp followers 104 will move upon the ramps 94 allowing the arms 92 to assume their more natural lower position and lower the rollers 102 thereby lowering the belts 108 out of engagement with the flat 140. As this occurs, the arms 92, being bias in a clockwise direction, will lower the rollers 102 below the platform 34 and the rollers 138 to hold the envelope 140 onto the platform 34.

With the platform 34 free to move as a result of disengagement of the locking mechanism 142, the electromagnet 38 will be pulsed to thereby cause oscillation of the platform 34. With such oscillation, the flex members 26 will bend and the transducer 32 will sense the frequency of such bending. Reference can be had to U.S. Pat. No. 4,778,018 wherein the weight of a mass on a platform can be determined and in particular to column 5 lines 60–68, columns 6 and 7 and column 8 lines 1 and 2 of such patent. The manner in which the weight is determined does not form part of the instant invention.

Upon the mass of the envelope 34 being determined the computer 150 will actuate the cam motor 60 to once more to cause the cam 64 to rotate thereby causing cam follower 72 to the cam to a location A and the cam follower 74 will contact the cam follower at a location B to drive the follower plate 48 to the right as indicated in FIG. 1. With such movement of the plate follower 48, the rollers 102 will be lifted as a result of the cam followers 104 riding on the ramps 94 to be driven into a higher elevation thereby causing the arms 92 to lift the rollers 102 to bring the belts 108 into contact with the flat 140. Upon the cam motor 60 being actuated a third a revolution as just described, the transport motor will then be started so that the drive roller 112 will cause the belts 108 to drive the flat off of the platform. In this way a weighing cycle has been accomplished and the process will be repeated once more for the next envelope to be weighed.

It has been found that the use of the cam 64 mechanism described for lowering and raising the rollers 102 has distinct advantages. The movement is achieved in a fast and quiet manner. Since only a third of a revolution is required and there is no change of direction by the cam followers 72, 74 in a given cycle.

Thus, what has been shown and described is a weighing scale 10 having a quiet and efficient transport control mechanism.

What is claimed is:

1. A vibrating tray scale having a tray supported by a plurality of flexure members mounted by a housing with one of the flexure members having a transducer thereon, a mechanism for initiating oscillation of the tray, hold down members supported by the housing for holding a flat article on the tray, a selectively operable locking mechanism for locking the tray when a flat article is being conveyed thereacross and releasing the tray during the weighing operation and a transport mechanism having a plurality of rollers supported by resilient arms for transporting flats across the platform upon rotation thereof, the improvement comprising:

a vertically extending, longitudinal plate movably supported by said housing and having a central opening and a plurality of ramps in contact with the rollers of the transport mechanism,
   a motor supported by the housing,
   a cam mounted on the output shaft of said motor and received within said central opening of said longitudinal plate, whereby upon said motor being enabled, said cam will drive said plate causing the rollers to move upon said ramps and be moved vertically.

2. The vibrating tray scale of claim 1 wherein said cam has a plurality of positions for moving said longitudinal plate to its extreme limits.

3. The vibrating tray scale of claim 1 wherein said cam is heart shaped.

4. The vibrating tray scale of claim 3 including a pair of cam followers attached to said plate and extending into said opening so as to engage said heart shaped cam on opposite sides thereof 5. The vibrating tray scale of claims 4, including a plurality of guide pins supported by said housing and wherein said plate has a plurality of longitudinal openings therein that receive said guide pins.

6. A vibrating tray scale having a tray supported by a plurality of flexure members mounted by a housing with one of the flexure members having a transducer thereon, a mechanism for initiating oscillation of the tray, and a selectively operable locking mechanism for locking the tray when a flat article is being conveyed thereacross and releasing the tray during the weighing operation for oscillation thereof, the improvement comprising:

a longitudinally movable plate movably supported by said housing and having a pair of elongated openings therein, a central opening and a plurality of ramps at the top thereof,
   a pair of rollers received within said elongated openings to guide said plate during longitudinal movement,
   a motor,
   a heart shaped cam mounted on the output shaft of said motor and received within said central opening of said longitudinal plate,
   a plurality of shafts, each shaft having a ramp follower supported by said ramps and a pair of rotatable rollers with a roller being located on each opposite side of each ramp follower, and means for rotating said rollers.

7. The vibrating tray scale of claim 6 wherein said cam has a plurality of positions for moving said longitudinal plate to its extreme limits.

8. A vibrating tray scale having a tray supported by a plurality of flexure members mounted by a housing with one of the flexure members having a transducer thereon, a mechanism for initiating oscillation of the tray, hold down members supported by the housing for holding a flat on the tray, a selectively operable locking mechanism for locking the tray when a flat article is being conveyed thereacross and releasing the tray during the weighing operation, and a transport mechanism having a plurality of rollers for transporting flats across the platform upon rotation thereof, the improvement comprising:

a longitudinal plate slidably supported by said housing and having a plurality of ramps,
   means for supporting the rollers of the transport mechanism, said support means being slidably in contact with said ramps.
   a motor supported by the housing,
   cam means connected to said motor and in engagement with said longitudinal plate, whereby upon said motor being enabled, said cam means will cause said longitudinal plate to move longitudinally to vertically move the rollers of the transport mechanisms through said support means in contact with said ramps.

9. The vibrating tray scale of claim 7 wherein said cam is heart shaped.

* * * * *